United States Patent
Nagashima

(10) Patent No.: US 6,327,481 B1
(45) Date of Patent: Dec. 4, 2001

(54) APPARATUS FOR AND METHOD OF ANTENNA-SWITCHED DIVERSITY RECEPTION

(75) Inventor: Noriaki Nagashima, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/256,910

(22) Filed: Feb. 24, 1999

(30) Foreign Application Priority Data

Feb. 26, 1998 (JP) .................................................. 10-062209

(51) Int. Cl.$^7$ ..................................................... H04B 7/10
(52) U.S. Cl. ........................... 455/562; 455/205; 455/275
(58) Field of Search .................................. 455/500, 560, 455/562, 101, 102, 205, 214; 375/200, 222, 219, 347, 275

(56) References Cited

U.S. PATENT DOCUMENTS

| | | | |
|---|---|---|---|
| 5,406,218 | * | 4/1995 | Ishihara ................................. 455/214 |
| 5,442,653 | * | 8/1995 | Saito ..................................... 375/219 |
| 5,499,397 | | 3/1996 | Wadin et al. ....................... 455/277.1 |
| 5,657,358 | * | 8/1997 | Panech et al. ........................ 455/422 |
| 5,920,593 | * | 7/1999 | Perl et al. ............................. 375/222 |
| 5,940,454 | * | 8/1999 | McNicol et al. ..................... 375/347 |
| 5,982,807 | * | 11/1999 | Snell ..................................... 375/200 |

FOREIGN PATENT DOCUMENTS

| | | |
|---|---|---|
| 0 419 674 A1 | 4/1991 | (EP) . |
| 6-90226 | 3/1994 | (JP) . |
| 10-256965 | 9/1998 | (JP) . |
| WO 94/13068 | 6/1994 | (WO) . |

* cited by examiner

Primary Examiner—Daniel Hunter
Assistant Examiner—Thuan T. Nguyen
(74) Attorney, Agent, or Firm—Scully, Scott, Murphy & Presser

(57) ABSTRACT

When demodulating data of each frame of a phase-modulated signal received by a selected one of antennas, a phase error detector detects a phase error as a deviation from an ideal phase, and an accumulator accumulates phase errors in the frames. If an accumulated value of the phase errors is greater than a predetermined value in a predetermined slot position in a frame, antenna switching is controlled for a next frame. In the antenna switching control process, the demodulated phase of a first antenna selected in a present frame is held in a phase holder. If the accumulated value of the phase errors becomes greater than the predetermined value, the first antenna is switched temporarily to a second antenna, and the demodulated phase of the second antenna is held in the phase holder. Based on reception statuses of the first and second antennas, either better one of the antennas is selected, one of the demodulated phases held in the phase holder is selected and provided to a demodulator.

13 Claims, 12 Drawing Sheets

APPARATUS FOR AND METHOD OF ANTENNA-SWITCHED DIVERSITY RECEPTION

BACKGROUND OF THE INVENTION

1. Field of the Invention

The present invention relates to a mobile radio communication system, and more particularly to an apparatus for and a method of antenna-switched diversity reception.

2. Description of the Related Art

Antenna diversity reception schemes are roughly classified into a post-detection selection diversity system and an antenna-switched diversity system. In the post-detection selection diversity system, antenna branches are associated with respective demodulators, and a demodulated signal from the antenna branch which represents the best signal reception is selected. While the post-detection selection diversity system is capable of good signal reception in fading environments, the circuit used by the system is relatively large in scale, expensive, and consumes a large amount of electric power because each of the antenna branches needs to be associated with a demodulator. There have been proposed various attempts to eliminate the above problems. For example, reference should be made to Japanese patent application laid-open No. 6-268635.

The antenna-switched diversity reception system switches between a plurality of antennas located in spatially different positions to select one of the antennas which provides a good reception quality. Since only the antennas are switched, the antenna-switched diversity reception system can easily meet the requirements for rendering communication apparatus small, lightweight, and low-power-consumption. However, the quality of received signals remains to be improved, and various efforts have been made to receive high-quality signals.

For example, Japanese patent application laid-open No. 5-206905 discloses an antenna-selected diversity receiver which measures reception powers of two antennas, twice for each antenna, immediately before a burst signal is received, linearly predicts reception powers of the antennas for the burst signal from the measured values, and stores the predicted values in a memory. For receiving the burst signal, one of the antennas whose predicted value is higher is selected.

Furthermore, using the reception power of the antenna which is being selected, a subsequent reception power is predicted, and the data stored in the memory is updated by the predicted value.

An antenna-selected diversity reception apparatus disclosed in Japanese patent application laid-open No. 7-235901 has a holding means for holding the reception levels of two antennas. When a certain signal inserted in a received signal is reached, one of the antennas whose reception level is higher is selected.

According to each of the above proposals, an antenna whose reception level is higher is selected to ensure a desired level of reception quality by switching between antennas even while a burst signal is being received.

With the antenna-selected diversity receiver which employs the linear predict for the reception powers in advance, since the switching between the antennas is controlled by the predicted values, the antennas may not be properly switched, resulting in a relatively high probability that a reception error occurs.

Furthermore, the antenna-selected diversity receiver needs a control system for performing predictive calculations. Such predictive calculations causes a large burden on the processor of the control system, and require the control system to have an increased circuit scale and consume an increased power.

The antenna-selected diversity reception apparatus which triggers the switching between the antennas with a certain signal inserted in a received signal is unable to switch between the antennas until the certain signal is received even when the reception state is impaired. Consequently, the antenna-selected diversity reception apparatus tends to cause a reception error.

SUMMARY OF THE INVENTION

It is therefore an object of the present invention to provide an antenna-switched diversity reception apparatus which is small and lightweight, has low power requirements, and can control antenna switching highly reliably without causing a reduction in reception quality.

Another object of the present invention is to provide a method of antenna-switched diversity reception to control antenna switching highly reliably without causing a reduction in reception quality.

According to the present invention, there is provided an apparatus for antenna-switched diversity reception, comprising demodulating means for demodulating data from a phase-modulated signal received by a selected one of antennas, phase error detecting means for detecting a phase error of each symbol of the received signal as a deviation from an ideal phase, accumulating means for accumulating phase errors, and control means for controlling switching between the antennas if an accumulated value of the phase errors is greater than a predetermined value. Preferably, the control means comprises means for switching the selected one of the antennas temporarily to another one of the antennas if the accumulated value of the phase errors is greater than the predetermined value, and controlling switching between the antennas by comparing a reception status of the selected one of the antennas with a reception status of the other one of the antennas.

Since the antenna switching is determined on the basis of the accumulated value of the phase errors, the antenna switching can be determined using a simple adder. Therefore, no special calculations are required, and the load on a control system and the power consumption thereby are reduced. Since when the accumulated value of the phase errors becomes greater than the predetermined value, the antenna is switched temporarily to the other antenna for comparison between the reception statuses. Consequently, the reception status of the other antenna can be known before normal antenna switching is effected, so that antenna switching can be effected highly reliably.

Furthermore, there is also provided in accordance with the present invention an apparatus for antenna-switched diversity reception of a phase-modulated signal composed of frames, comprising demodulating means for demodulating data from each of the frames of the phase-modulated signal received by a selected one of antennas, phase error detecting means for detecting a phase error of each symbol of the received signal as a deviation from an ideal phase, accumulating means for accumulating phase errors of the respective frames, and control means for controlling switching between the antennas in a next frame if an accumulated value of the phase errors is greater than a predetermined value at a predetermined position in one of the frames.

The demodulating means comprises phase holding means for holding phases of a plurality of demodulated clock signals, selecting means for selecting the phase of a desired one of the demodulated clock signals, and a demodulator for demodulating the data according to the selected phase of the demodulated clock signal. Preferably, the control means comprises means for, if the accumulated value of the phase errors in a past frame is smaller than the predetermined value at the predetermined position in the frame, holding the phase of the demodulated clock signal in the frame in the phase holding means, holding the phase of the demodulated clock signal of a first antenna selected in a present frame in the phase holding means, and when the accumulated value of the phase errors is greater than the predetermined value, switching the first antenna temporarily to a second antenna, holding the phase of the demodulated clock signal of the second antenna in the phase holding means, selecting either one of the antennas based on a reception status of the first antenna and a reception status of the second antenna, selecting one of the phases of the demodulated clock signals held by the phase holding means, and providing the selected one of the phases to the demodulator.

According to the present invention, furthermore, a method of antenna-switched diversity reception of a phase-modulated signal composed of frames holds the phases of demodulated clock signals, and loads a proper one of the held phases for antenna switching to start receiving data. Accordingly, the success of signal reception is greatly increased.

The above and other objects, features and advantages of the present invention will become apparent from the following description with reference to the accompanying drawings which illustrate examples of the present invention.

DESCRIPTION OF THE PREFERRED EMBODIMENTS

Figure 1:
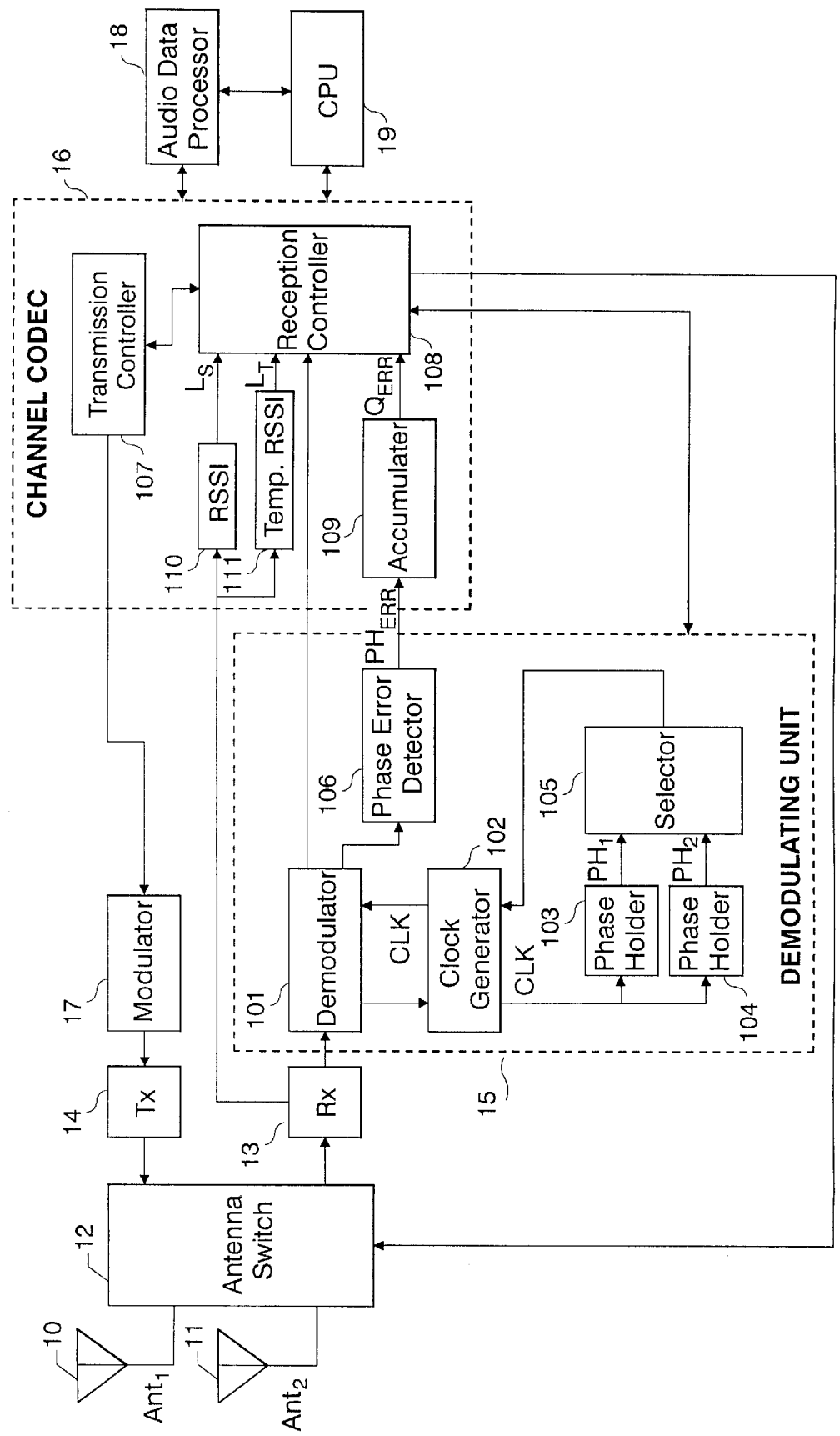
FIG. 1 is a block diagram of an antenna-switched diversity reception apparatus according to a first embodiment of the present invention.

FIG. 1 shows in block form an antenna-switched diversity reception apparatus according to a first embodiment of the present invention, which is typically incorporated in a radio communication system.

As shown in FIG. 1, the radio communication system has two antennas 10, 11 those are selectively connected to receiver 13 and transmitter 14 by antenna switch 12. For example, when the radio communication system is in a reception mode, antenna switch 12 selects either one of antennas 10, 11 and connects the selected antenna to receiver 13.

Receiver 13 amplifies a radio signal received by the selected antenna and sends the amplified radio signal to demodulating unit 15. Receiver 13 also measures the RSSI (Received Signal Strength Indicator) of the received radio signal, and supplies the measured RSSI to channel codec (channel controller) 16.

Transmitter 14 is connected through modulator 17 to channel codec 16. Channel codec 16 generates transmission data having a predetermined frame format and supplies the generated transmission data. Modulator 17 modulates, e.g. quadrature-modulates, a carrier with the supplied transmission data. The modulated carrier is amplified or frequency-converted by the transmitter 14, and then transmitted from one of the antennas 10 and 11 which is selected by antenna switch 12.

To channel codec 16, there are connected audio data processor 18 and processor 19 which controls the radio communication system entirely.

A cordless telephone system such as a PHS (Personal Handyphone System) employs quadrature phase shift keying (QPSK) with 2 bits per symbol and a transmission rate of 384 Kbits/sec., and a channel system of TDMA/TDD (Time Division Multiple Access/Time Division Duplexing).

The demodulating unit 15 has a demodulator 101 and a clock regenerator 102. The clock regenerator 102 is supplied with a demodulated signal from the demodulator 101 and regenerates a clock signal CLK from the demodulated signal and returns the regenerated clock signal CLK to demodulator 101. Demodulator 101 demodulates a received signal, identifies the demodulated signal according to the regenerated clock signal CLK, and outputs the identified demodulated signal to channel codec 16.

Demodulating unit 15 also has a pair of phase holders 103, 104 for holding phase planes of the regenerated clock signal in the operation of each antenna branch in a reception mode. Selector 105 selects either one of phases $PH_1$, $PH_2$ held by phase holders 103, 104. Clock regenerator 102 loads the selected phase thereby to forcibly change the clock phase.

Demodulating unit 15 further includes phase error detector 106 which detects an error (phase error) $PH_{ERR}$ of the phase of a received signal which has been demodulated by demodulator 101. For example, for phase modulation such as PSK (Phase Shift Keying) or QPSK, phase error detector 106 detects an error between the actual received phase of each symbol of a received signal and the ideal phase (¼, 3¼, etc.) which such each symbol should have. Phase error detector 106 outputs the detected phase error $PH_{ERR}$ to channel codec 16.

Channel codec 16 comprises transmission controller 107, reception controller 108, and accumulator 109 for accumulating phase errors $PH_{ERR}$ supplied from phase error detector 106 of demodulating unit 15. As described later on, accumulator 109 accumulates phase errors $PH_{ERR}$ within a predetermined frame period, and outputs an accumulated phase error value $Q_{ERR}$ to reception controller 108. Channel codec 16 also has received signal strength indicator memory 110 for storing a normal received signal strength indicator $L_S$ and temporary received signal strength indicator memory 111 for storing temporary received signal strength indicator $L_T$.

Reception controller 108 controls antenna switch 12, clock regenerator 102, and selector 105, using an accumulated phase error value $Q_{ERR}$ from accumulator 109, a normal received signal strength indicator $L_s$ stored in received signal strength indicator memory 110, and a temporary received signal strength indicator $L_T$ from temporary received signal strength indicator memory 111. Reception controller 108 also corrects the frame timing based on a synchronizing signal detected from received data, determines a channel identifier, and checks errors.

Figure 2A:
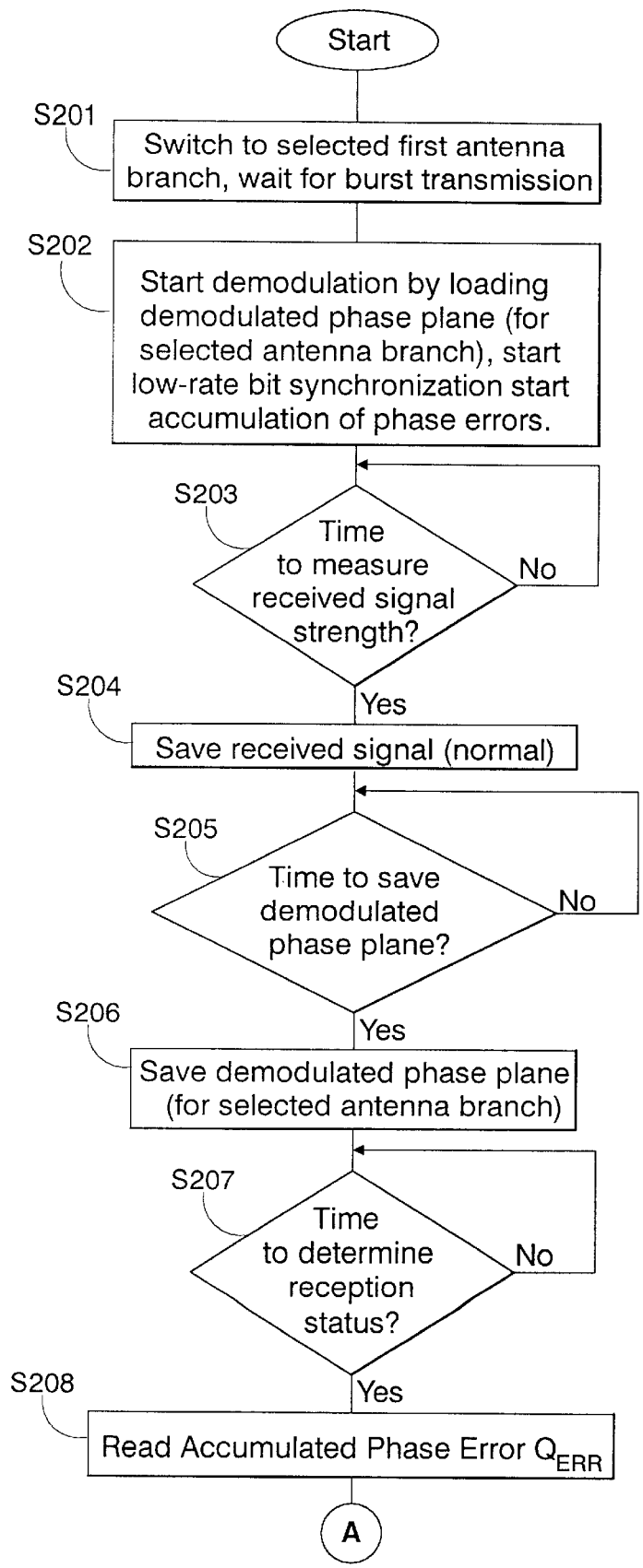
FIG. 2 is a flowchart of an antenna-switched diversity reception method carried out by the antenna-switched diversity reception apparatus according to the first embodiment of the present invention as shown in FIG. 1.
Figure 2B:
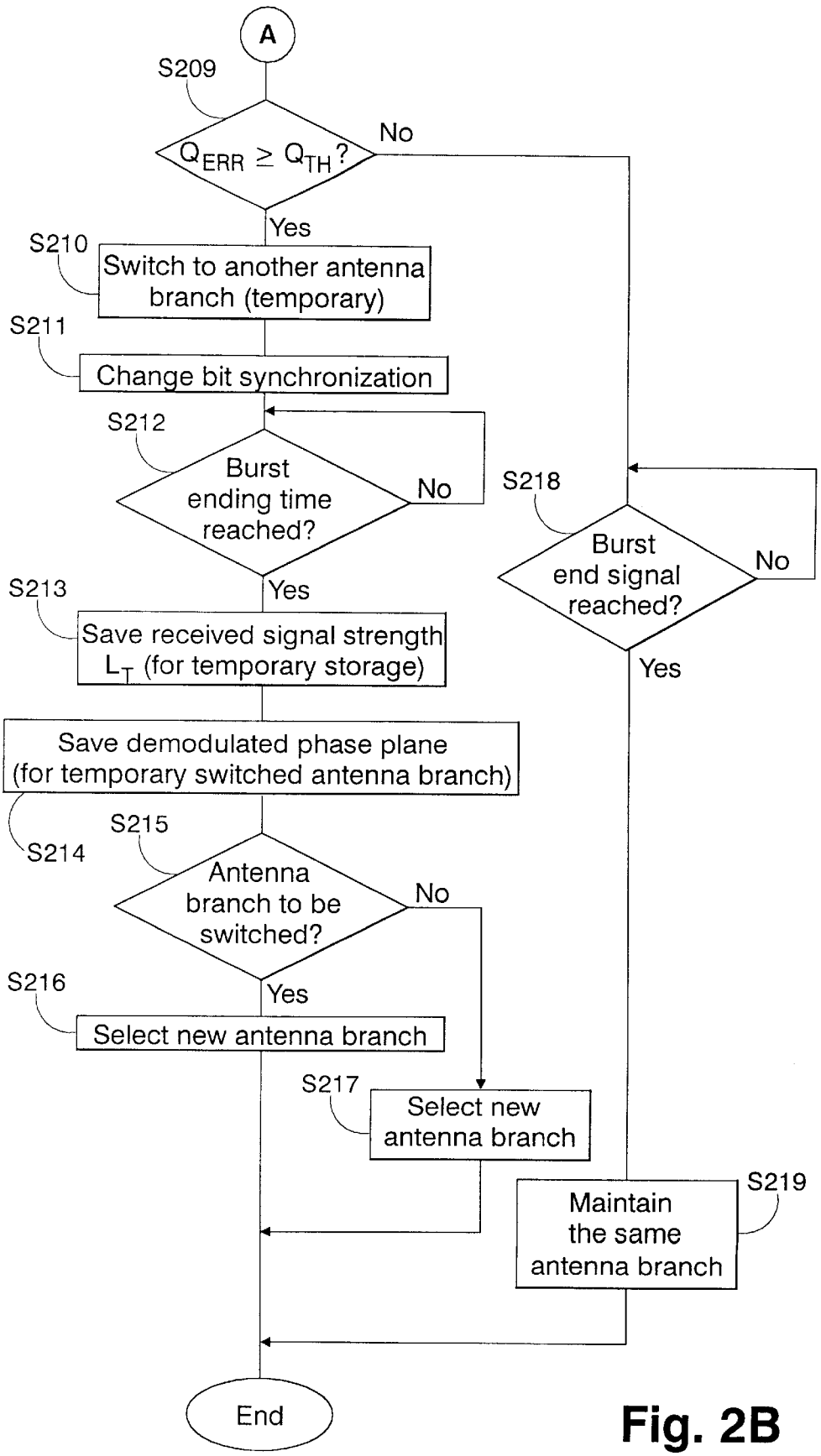

FIG. 2 shows an antenna-switched diversity reception method carried out by the antenna-switched diversity reception apparatus according to the first embodiment of the present invention as shown in FIG. 1.

Figure 3:
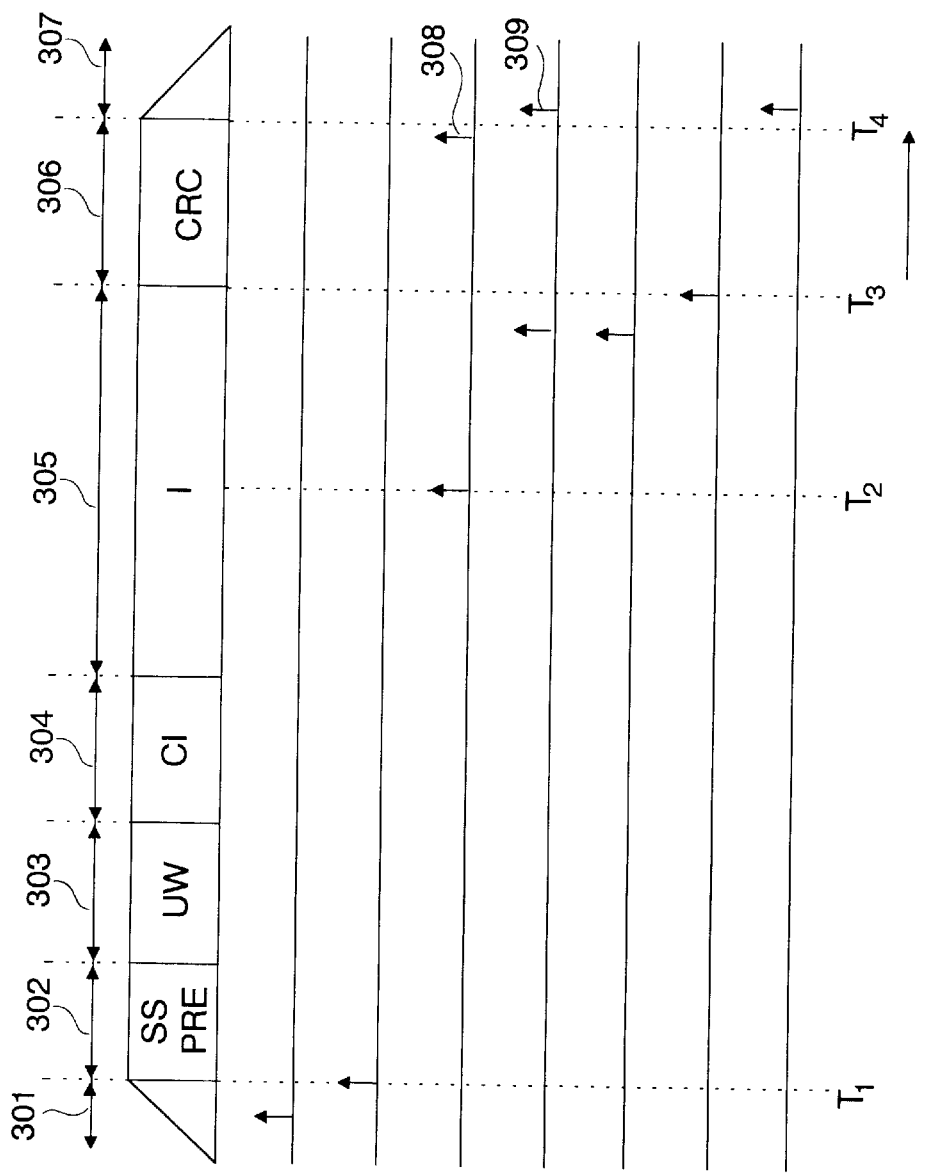
FIG. 3 is a timing chart showing the format of a received signal and events in the operation of the antenna-switched diversity reception apparatus according to the first embodiment of the present invention.

FIG. 3 shows the format of a received signal and events in the operation of the antenna-switched diversity reception apparatus according to the first embodiment of the present invention.

Demodulation of a digital signal having a format shown in FIG. 3 with the demodulator 15 in one TDMA/TDD reception slot will be described below. As shown in FIG. 3, one frame comprises, following a ramp time 301, a 2-bit start symbol SS and a 6-bit preamble PRE (a period 302), a 16-bit unique word UW (a period 303), a 4-bit channel identifier CI (a period 304), a 180-bit information block I (a period 305), and a 16-bit cyclic redundancy code check bit CRC (a period 306). The check bit CRC is followed by a guard bit period 307.

For the sake of brevity, it is assumed that in a preceding reception slot, an antenna to be selected this time has been determined as antenna 10, and the phase $PH_1$ of a demodulated clock corresponding to the antenna branch has been saved in phase holder 103.

As shown in FIG. 3 at (A), in ramp time 301 prior to a reception slot time $T_1$ or ahead of the ramp time 301, reception controller 108 controls antenna switch 12 to connect antenna 10 to receiver 13, and waits for the beginning of a reception slot in step S201.

As shown in FIG. 3 at (B), when the reception slot timing $T_1$ is detected, reception controller 108 controls demodulator 15 to load the phase $PH_1$ of the selected antenna branch into block regenerator 102 through selector 105, starting to operate demodulator 101 in synchronism with low-rate bits. At the same time, reception controller 108 clears the accumulator 109 and controls the accumulator 109 to start accumulating phase errors in step S202.

Alternatively, when connecting a selected antenna branch to receiver 13 in step S201, reception controller 108 may load the phase $PH_1$ of the selected antenna branch, which has been held in phase holder 103, into block regenerator 102 through selector 105, and may establish a bit synchronizing rate. When the reception slot timing $T_1$ is subsequently detected, reception controller 108 may start to operate demodulator 101.

Received data which has been demodulated by demodulator 101 is supplied to reception controller 108, which detects the unique word UW and corrects the frame timing. Concurrent with this, the phase error detector 106 detects the absolute values $PH_{ERR}$ of phase errors from demodulator 101, and successively outputs the detected absolute values $PH_{ERR}$ of phase errors to accumulator 109 of channel codec 16. Accumulator 109 accumulates and adds the supplied absolute values $PH_{ERR}$ of phase errors.

Reception controller 108 decides whether a signal strength measuring time $T_2$ is reached or not in step S203. If the signal strength measuring time $T_2$ is reached (YES in step S203), then reception controller 108 reads a normal received signal strength indicator $L_S$ from receiver 13, and stores the normal received signal strength indicator $L_S$ in the received signal strength indicator memory 110 in step S204. The signal strength measuring time $T_2$ is located substantially centrally in the frame, as shown in FIG. 3 at (C).

Then, reception controller 108 decides whether a phase saving time is reached or not in step S205. If the phase saving time is reached (YES in step S205), reception controller 108 controls demodulator 15 to hold the phase of a reproduced clock signal CLK of the presently selected antenna branch in phase holder 103 in step S206. The phase saving time should preferably be as close to the trailing end of the frame as possible so that the entire frame can be evaluated in its entirety. In the illustrated embodiment, as shown in FIG. 3 at (D), the phase saving time is established immediately prior to the time $T_3$ of the trailing end of the information block I.

Reception controller 108 decides whether a reception status judging time or not in step S207. The reception status judging time is established immediately prior to the time $T_3$ of the trailing end of the information block I, as shown in FIG. 3 at (E). If the reception status judging time is reached (YES in step S207), then reception controller 108 reads an accumulated phase error value $Q_{ERR}$ from accumulator 109 in step S208, and compares the accumulated phase error value $Q_{ERR}$ with a predetermined threshold level $Q_{TH}$ in step S209.

If the accumulated phase error value $Q_{ERR}$ is equal to or greater than the predetermined threshold level $Q_{TH}$ (YES in step S209), then reception controller 108 temporarily operates antenna switch 12 to switch to the other antenna branch (the antenna 11 in this embodiment) in step S210. Reception controller 108 controls clock regenerator 102 to change the bit synchronizing rate in order to be able to effect synchronization in the remaining period of the received frame in step S211.

The branch switching time is set to the time $T_3$ of the trailing end of the information block I, as shown in FIG. 3 at (F).

While receiving a signal with the other antenna branch, reception controller 108 decides whether a frame ending time $T_4$ is reached or not in step S212.

Immediately prior to the frame ending time $T_4$, reception controller 108 reads a temporary received signal strength indicator RSSI again from receiver 13, and stores the temporary received signal strength indicator RSSI in the temporary received signal strength indicator memory 111 in step S213. Reception controller 108 controls demodulator 15 to hold the phase of the regenerated clock signal CLK of the temporarily selected antenna branch in phase holder 104 in step S214.

Since demodulator 101 usually suffers a delay, as shown in FIG. 3 at (C) and (D), time 308 to read the temporary received signal strength indicator RSSI in step S213 is controlled to be immediately prior to the frame ending time $T_4$, and a time 308 to store the phase of the regenerated clock signal in phase holder 104 in step S214 is controlled to be immediately after the frame ending time $T_4$.

In this manner, the received signal strength indicator and the demodulated clock phase of the normally selected antenna branch and the received signal strength indicator and the demodulated clock phase of the temporarily selected other antenna branch are stored in one frame period. The reception controller 108 compares the received signal strength indicators of the two antenna branches to decide whether to switch between the antenna branches or not in step S215. Various variations are considered with respect to standards for deciding whether to switch between the antenna branches. Such variations will be described later on with reference to FIGS. 9 through 11.

If the antenna branches are to be switched (YES in step S215), then reception controller 108 determines the other new antenna branch which has presently been temporarily selected as a reception antenna for a next reception slot in step S216. If the antenna branches are not to be switched (NO in step S215), then reception controller 108 determines the old antenna branch which has presently been initially selected as a reception antenna for a next reception slot in step S217. If the accumulated phase error value $Q_{ERR}$ is smaller than the predetermined threshold level $Q_{TH}$ (NO in step S209), then reception controller 108 waits until the frame ending time is reached (YES in step S218), and thereafter maintains the antenna branch which has presently been normally selected as a reception antenna for a next reception slot in step S219.

Figure 4:
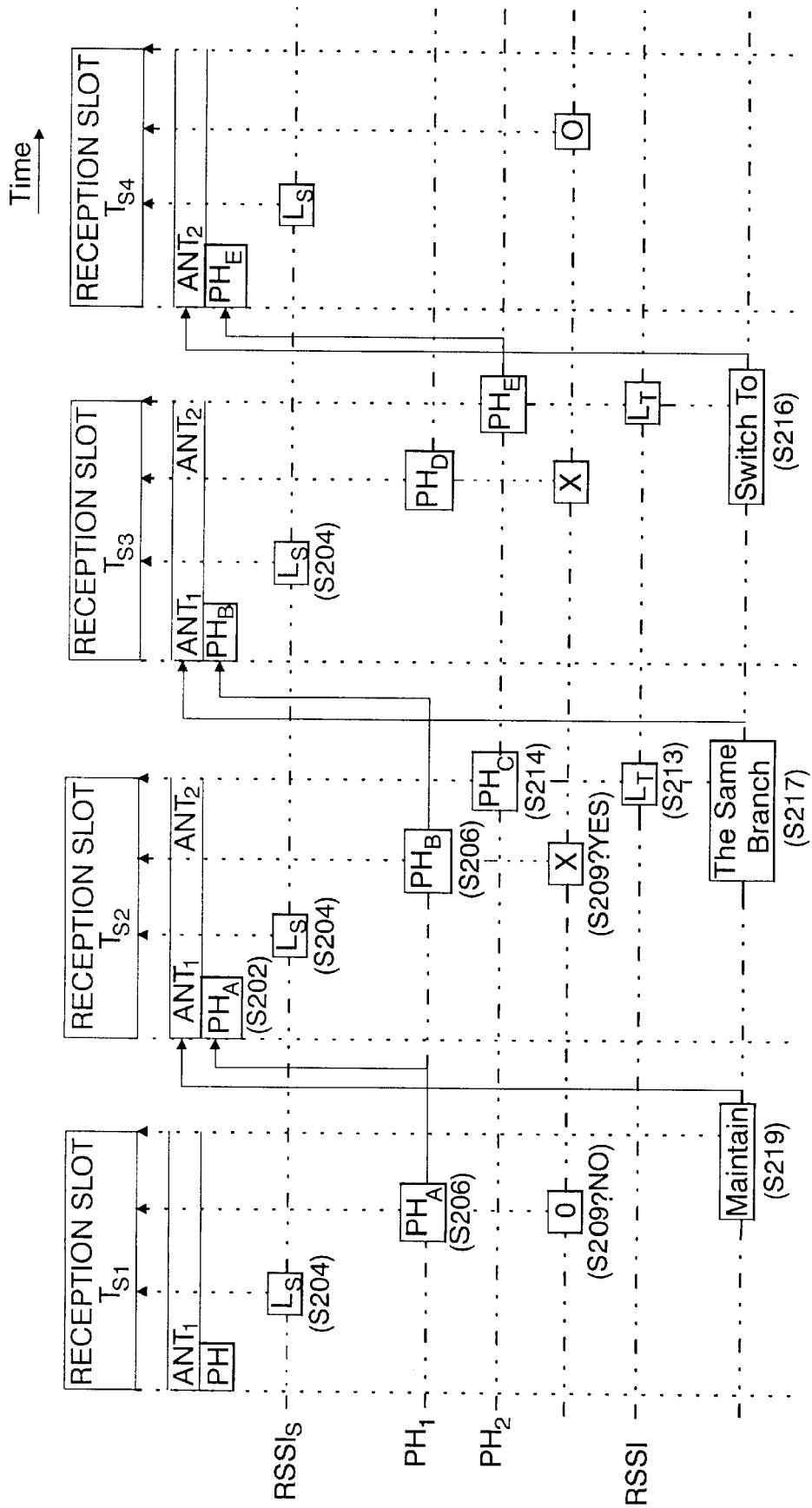
FIG. 4 is a timing chart illustrative of antenna switching and phase plane loading when the antenna-switched diversity reception method shown in FIG. 2 is carried out over a plurality of reception slots.

FIG. 4 is illustrative of antenna switching and phase plane loading when the antenna-switched diversity reception method shown in FIG. 2 is carried out over a plurality of reception slots. For the sake of brevity, four reception slots $T_{S1}$–$T_{S4}$ are shown in FIG. 4. FIG. 4 shows that the reception status is good in the reception slot $T_{S1}$ and the selected antenna branch is maintained also in the next reception slot $T_{S2}$ (this operation corresponds to step S219). That is, FIG. 4 shows that the accumulated phase error value $Q_{ERR}$ is smaller than the predetermined threshold level $Q_{TH}$ in step S209 shown in FIG. 2. FIG. 4 also shows that when the reception statuses of both the antenna branches are not good, the old antenna branch is selected for the next reception slot $T_{S3}$ (this operation corresponds to step S217), and that when the reception status of the initial antenna branch is not good but the reception status of the other antenna branch switched from the initial antenna branch is good, the new antenna branch which has finally been switched is selected for the next reception slot $T_{S4}$ (this operation corresponds to step S216). The operation in each slot is shown in the timing chart of FIG. 2.

Figure 5:
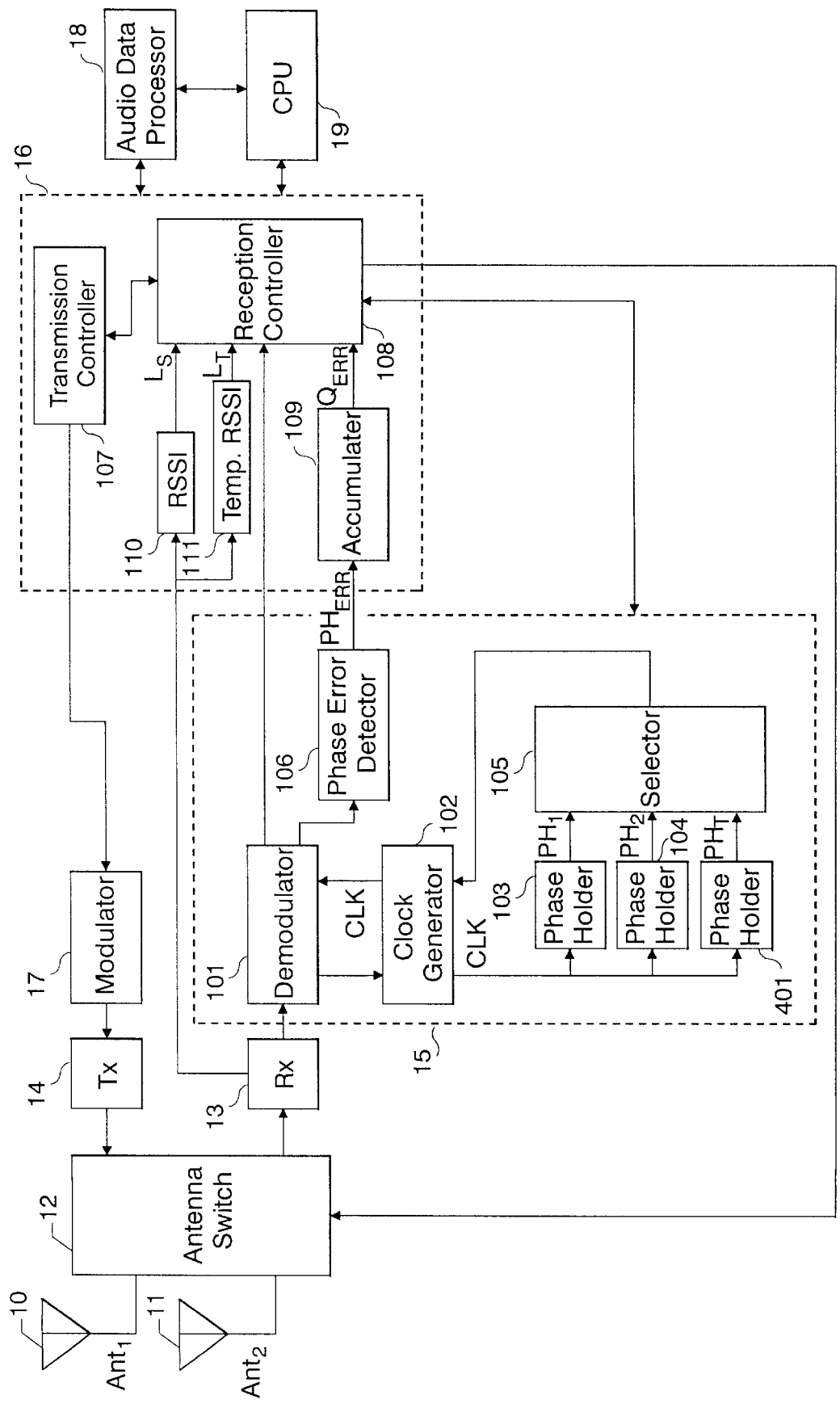
FIG. 5 is a block diagram of an antenna-switched diversity reception apparatus according to a second embodiment of the present invention.

FIG. 5 shows in block form an antenna-switched diversity reception apparatus according to a second embodiment of the present invention. Those blocks shown in FIG. 5 which are identical to those shown in FIG. 1 are denoted by identical reference numerals, and will not be described in detail below.

In the second embodiment, demodulator 15 has temporary phase holder 401 in addition to phase holders 103, 104. Selector 105 can select either one of phases $PH_1$, $PH_2$, $PH_T$ stored in phase holders 103, 104, 401 and output the selected phase to the clock regenerator 102. With this arrangement, when the antennas are temporarily switched, the phase plane of the first antenna branch can be loaded for demodulation, and when the reception statuses of both the antenna branches are not good, the old branch can be selected in the next reception slot and the phase of the preceding reception slot can be loaded.

Figure 6A:
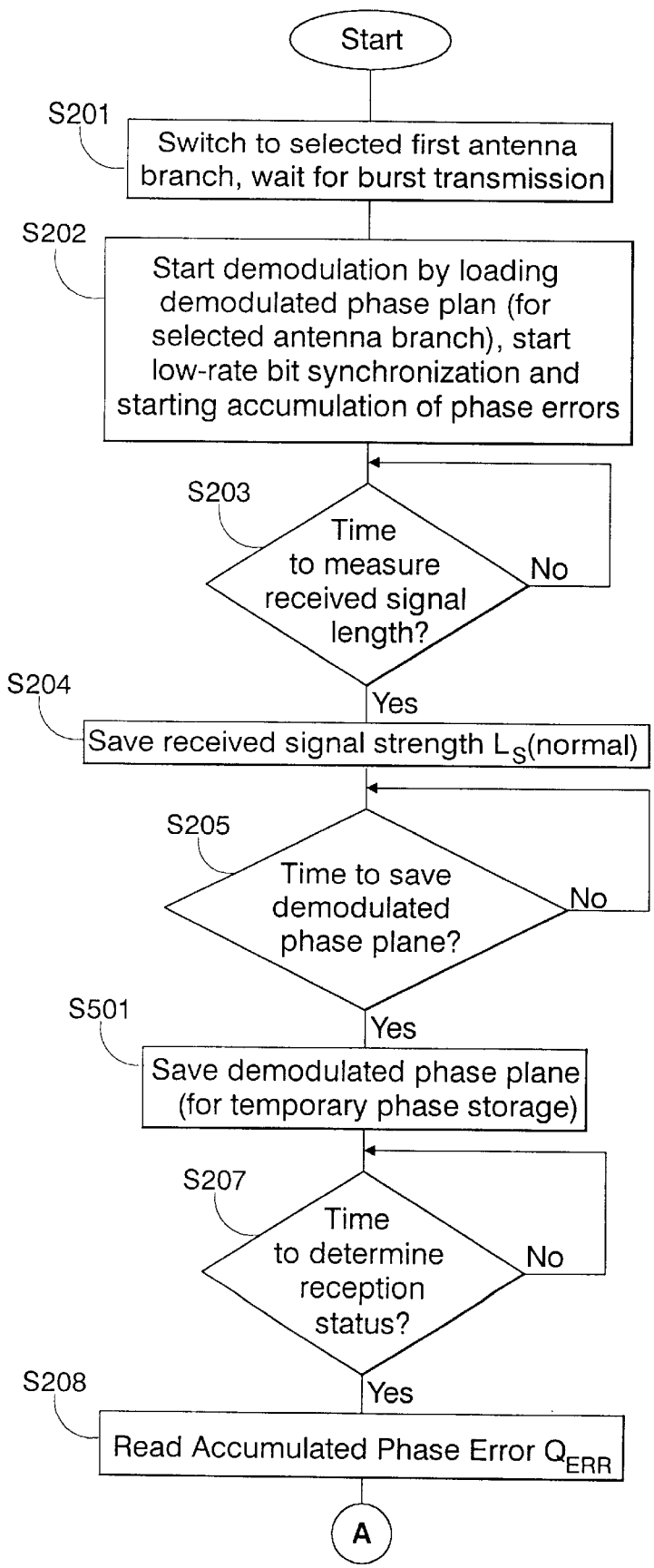
FIG. 6 is a flowchart of an antenna-switched diversity reception method carried out by the antenna-switched diversity reception apparatus according to the second embodiment of the present invention shown in FIG. 5.
Figure 6B:
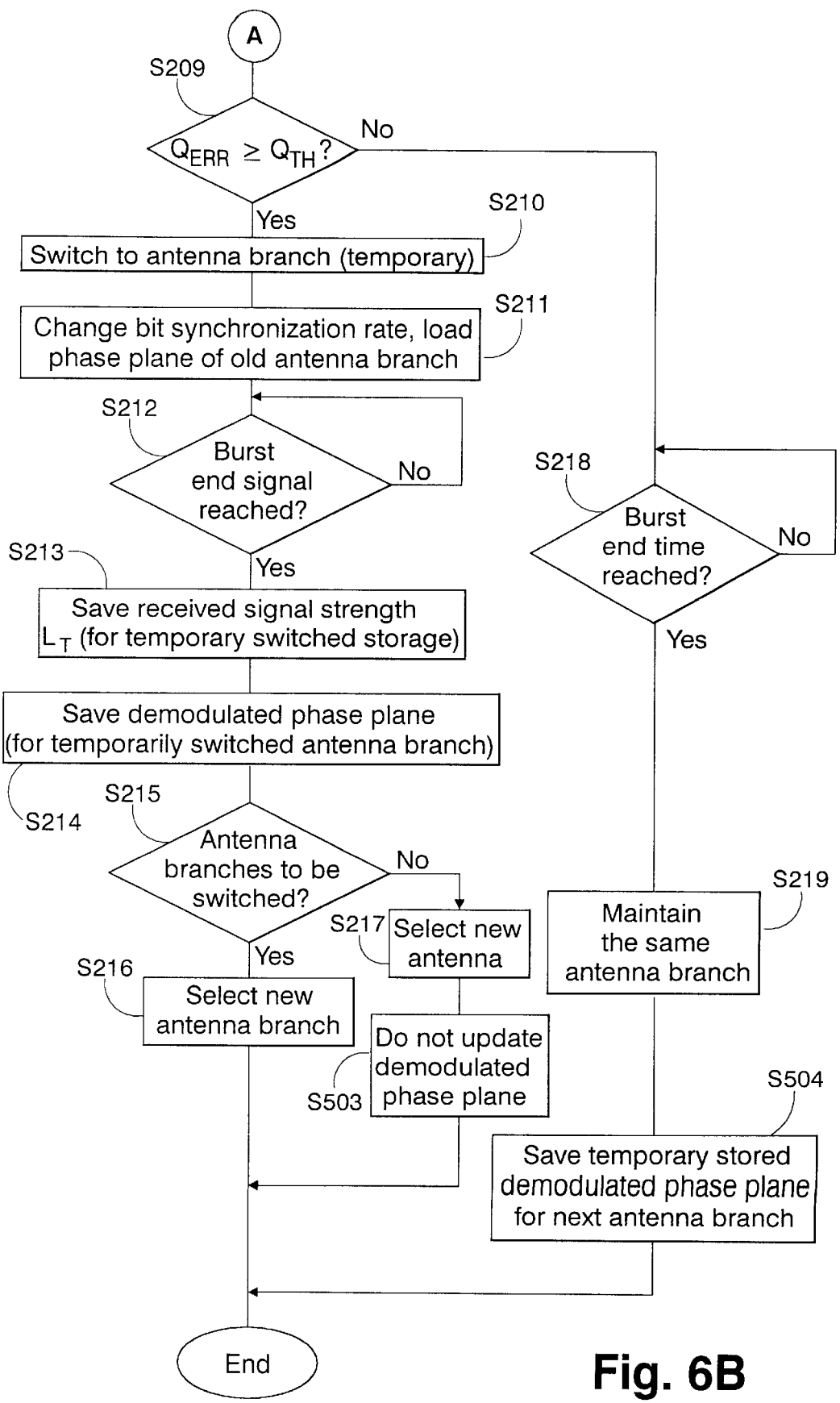

FIG. 6 shows an antenna-switched diversity reception method carried out by the antenna-switched diversity reception apparatus according to the second embodiment of the present invention shown in FIG. 5.

Those steps shown in FIG. 6 which are identical to those shown in FIG. 2 are denoted by identical reference characters, and will not be described in detail below.

In FIG. 6, after the received signal strength indicator RSSI of a selected antenna branch is stored in step S204, at a phase saving time (YES in step S205), reception controller 108 controls demodulator 15 to hold the phase of a reproduced clock signal CLK of the presently selected antenna branch in temporary phase holder 401 in step S501. The phase saving time should preferably be as close to the trailing end of the frame as possible so that the entire frame can be evaluated in its entirety. In the illustrated embodiment, as shown in FIG. 3 at (D), the phase saving time is established immediately prior to the time $T_3$ of the trailing end of the information block I.

If the reception status judging time is reached (YES in step S207) and the accumulated phase error value $Q_{ERR}$ is greater than the predetermined threshold level $Q_{TH}$ (YES in step S209), then reception controller 108 temporarily operates antenna switch 12 to switch to the other antenna branch in step S210. Reception controller 108 controls clock regenerator 102 to change the bit synchronizing rate in order to be able to effect synchronization in the remaining period of the received frame, and loads the phase plane $PH_T$ previously held in temporary phase holder 401 into clock regenerator 102 in step S502. The branch switching time is set to the time $T_3$ of the trailing end of the information block I, as shown in FIG. 3 at (F).

With a signal being received with the other antenna temporarily selected and clock regenerator 102 operating according to the phase plane $PH_T$, reception controller 108 reads a temporary received signal strength indicator RSSI again from receiver 13 immediately prior to the frame ending time $T_4$, and stores the temporary received signal strength indicator RSSI in the temporary received signal strength indicator memory 111 in step S213. Reception controller 108 controls demodulator 15 to hold the phase of the regenerated clock signal CLK of the temporarily selected antenna branch in phase holder 104 in step S214.

In this manner, the demodulated clock phase in the preceding reception slot, the received signal strength indicator and the demodulated clock phase of the normally selected antenna branch, and the received signal strength indicator and the demodulated clock phase of the temporarily selected other antenna branch are stored in one frame period. Reception controller 108 compares the received signal strength indicators of the two antenna branches to decide whether to switch between the antenna branches or not in step S215. Various variations are considered with respect to standards for deciding whether to switch between the antenna branches. Such variations will be described later on with reference to FIGS. 9 through 11.

If the antenna branches are to be switched (YES in step S215), then reception controller 108 determines the other new antenna branch which has presently been temporarily selected as a reception antenna for a next reception slot in step S216. If the antenna branches are not to be switched (NO in step S215), then reception controller 108 determines the old antenna branch which has presently been initially selected as a reception antenna for a next reception slot in step S217. The demodulated clock phase in the preceding reception slot is used as the phase plane in step S503.

If the accumulated phase error value $Q_{ERR}$ is smaller than the predetermined threshold level $Q_{TH}$ (NO in step S209), then reception controller 108 waits until the frame ending time is reached (YES in step S218), and thereafter maintains the antenna branch which has presently been normally selected as a reception antenna for a next reception slot in step S219. Reception controller 108 transfers the demodulated clock phase held in temporary phase holder 401 as an initial phase for a next reception slot to the phase holder 103, which holds the transferred demodulated clock phase in step S504.

Figure 7:
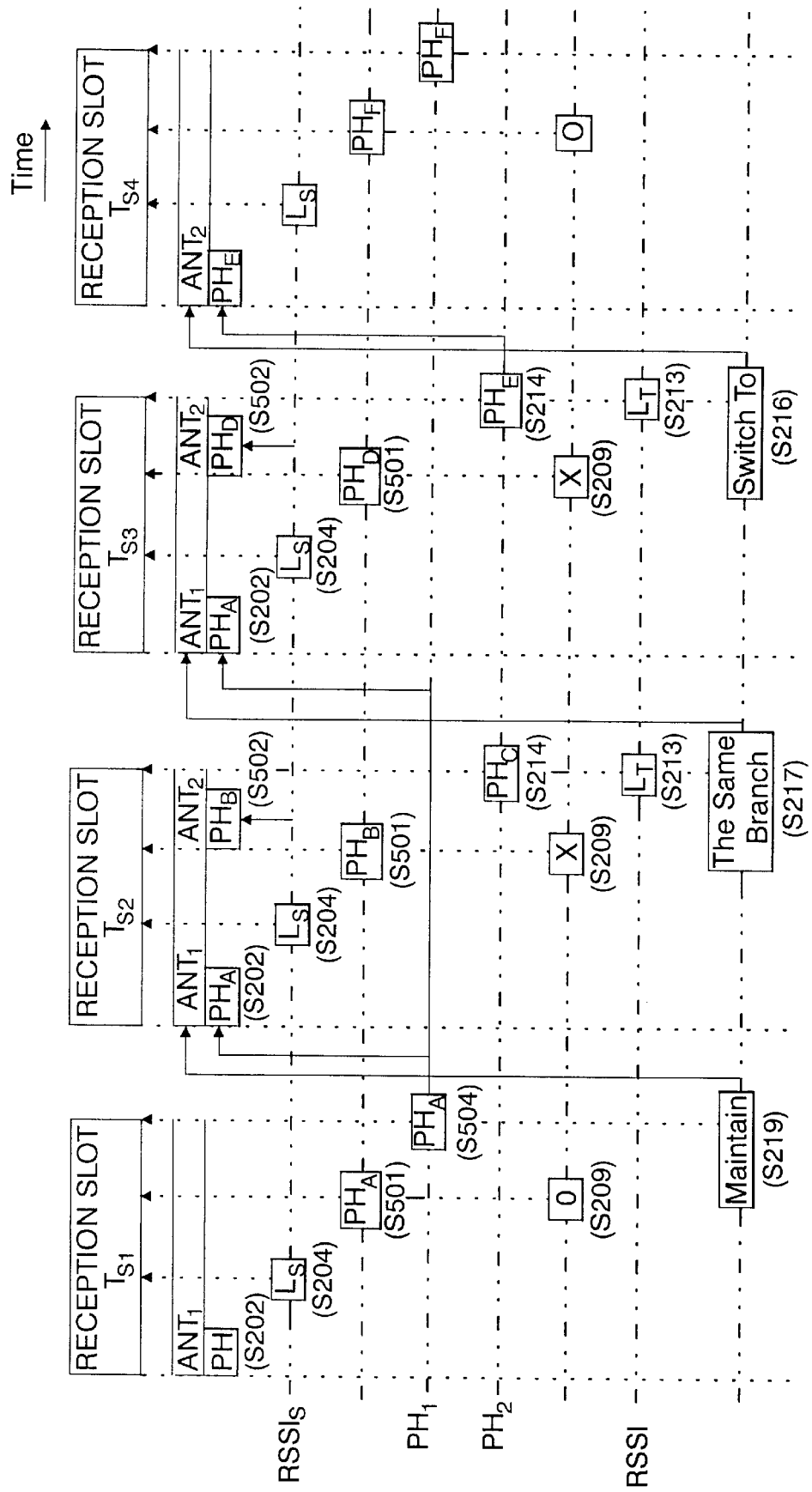
FIG. 7 is a timing chart illustrative of antenna switching and phase plane loading when the antenna-switched diversity reception method shown in FIG. 6 is carried out over a plurality of reception slots.

FIG. 7 is illustrative of antenna switching and phase plane loading when the antenna-switched diversity reception method shown in FIG. 6 is carried out over a plurality of reception slots. For the sake of brevity, four reception slots $T_{S1}-T_{S4}$ are shown in FIG. 7. FIG. 7 shows that the reception status is good in the reception slot $T_{S1}$ and the selected antenna branch is maintained also in the next reception slot $T_{S2}$ (this operation corresponds to step S219). That is, if the accumulated phase error value $Q_{ERR}$ is smaller than the predetermined threshold level $Q_{TH}$ in step S209 shown in FIG. 2, then the antenna branch is maintained, and the phase plane $PH_A$ held in the temporary phase holder 401 is used as an initial phase $PH_A$ for the start of a next reception slot.

In the reception slot $T_{S2}$, when the reception statuses of both the antenna branches are not good, the old antenna branch is selected for the next reception slot $T_{S3}$ (this operation corresponds to step S217), and the initial phase $PH_A$ in the preceding reception slot $T_{S1}$, which is held in phase holder 103, is used as the initial phase thereof (this operation corresponds to step S503). If the accumulated phase error is large and no switching to the other antenna branch is possible, therefore, since the reliability of the demodulated phase plane detected in the reception slot is considered to be low, the demodulated phase plane is not employed, but the phase plane in the preceding reception slot is employed.

FIG. 7 shows that in the reception slot $T_{S3}$, when the reception status of the initial antenna branch is not good but the reception status of the other antenna branch switched from the initial antenna branch is good, the new antenna branch which has finally been switched is selected for the next reception slot $T_{S4}$ (this operation corresponds to step S216).

According to the second embodiment, furthermore, after the phase plane has been held in the temporary phase holder 401 in step S501, if the accumulated phase error value $Q_{ERR}$ is equal to or greater than the predetermined threshold level $Q_{TH}$, i.e., if the reception status of the initial antenna branch is not good, as shown in the reception slots $TS_2$, $TS_3$, then the antenna branches are switched in step S210, and the phase plane ($PH_B/PH_D$) in the reception slot, which is held in the temporary phase holder 401, is loaded for reception in step S502.

When the antenna branches are temporarily switched, it is necessary to effect synchronization in a relatively short period of time. Generally, insofar as the reception statuses are good, the demodulated phase planes of both the antenna branches are substantially coincide each other unless the antenna branches are spatially spaced apart from each other or the modulation rate is very high. Therefore, when the demodulated phase plane prior to the temporary antenna branch switching is loaded to start synchronization immediately after the antenna branches are switched, the accuracy of phase synchronization and the success of demodulation after the temporary antenna branch switching are increased.

If the threshold level $Q_{TH}$ for the accumulated phase error value $Q_{ERR}$ used in step S209 shown in FIG. 6 is set to a reduced value, then the advantages of the second embodiment manifest themselves because the reliability of the demodulated phase plane information in the preceding reception slot is greater.

The process of loading the demodulated phase plane prior to the temporary antenna branch switching to start synchronized lead-in immediately after the antenna branches are switched in step S502, and the process of selecting the old antenna branch for the next reception slot and using the phase plane in the preceding reception slot $T_{S1}$ as the initial phase thereof in step S503 may be employed individually to provide their respective advantages.

Figure 8:
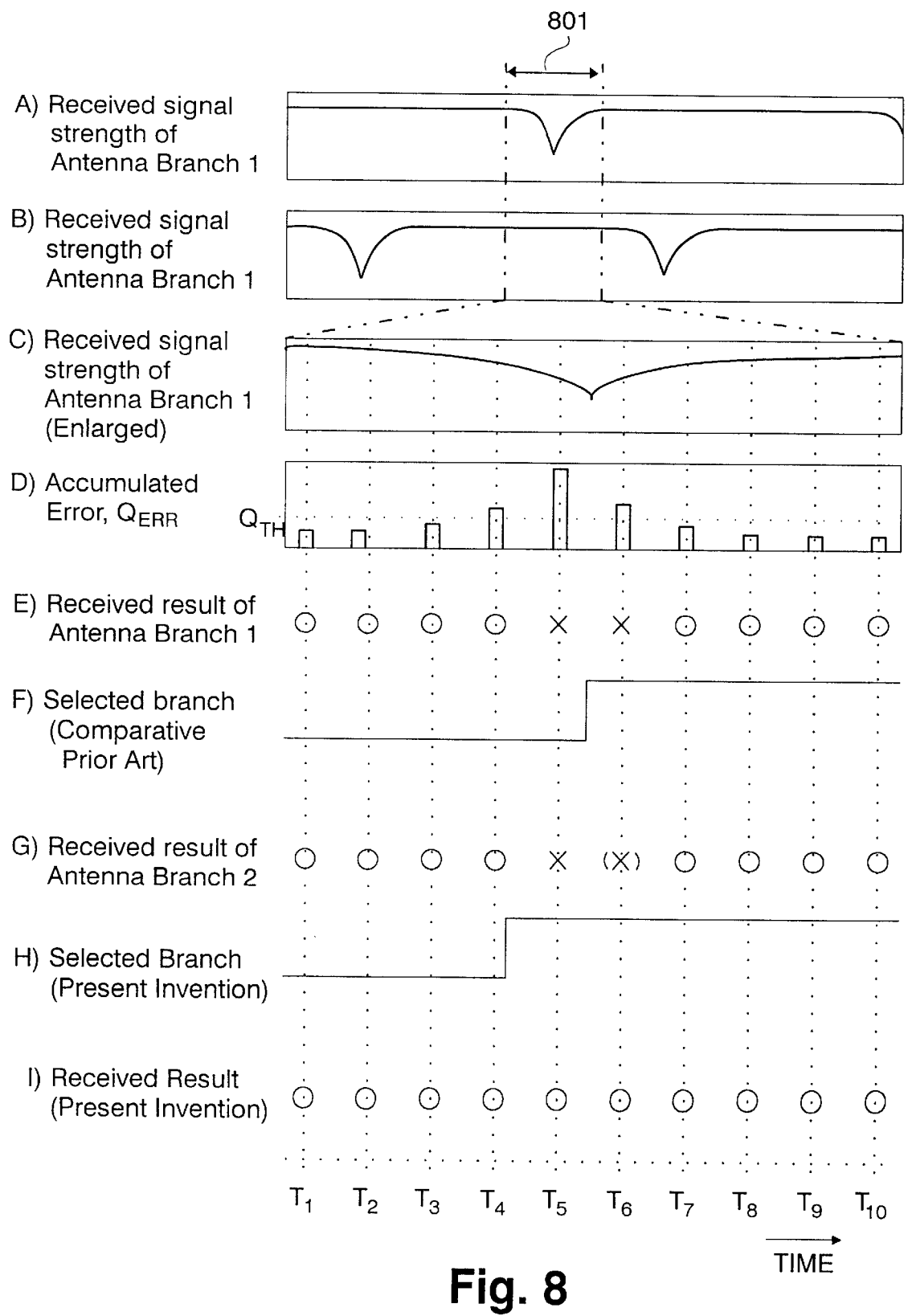
FIG. 8 is a timing chart illustrative of the operation of the present invention and reception results in fading environments.

FIG. 8 is illustrative of the operation of the present invention and reception results in fading environments. It is assumed that as shown in FIG. 8 at (A), an antenna branch 1 suffers a reduction in the received signal strength due to multipath fading in a period 801, and as shown in FIG. 8 at (B), another antenna branch 2 has a good reception status in the period 801. FIG. 8 shows at (C) the period 801 on an enlarged scale in time, the period 801 including reception times $T_1-T_{10}$.

As shown in FIG. 8 at (D), as the received signal strength decreases with the fading, the accumulated phase error $Q_{ERR}$ increases, and becomes maximum at the reception time $T_5$. If only the antenna branch 1 is used and no switching is made from the antenna branch 1, then a reception failure occurs at the reception times $T_5$, $T_6$, as shown in FIG. 8 at (E).

FIG. 8 shows at (F), (G) a comparative example in which the antenna branches are switched after a reception failure is detected. In the comparative example, switching is made from the antenna branch 1 to the antenna branch 2 after the occurrence of a reception failure. In this case, there is no guarantee that the demodulated phase plane of the antenna branch 2 will agree with the demodulated phase plane of the antenna branch 1, and the reception status of the antenna branch 2 is not determined. Thus, a reception error tends to happen when the antenna branches are switched. Consequently, as shown in FIG. 8 at (G), it is highly possible that a reception error will occur in successive two frames before and after the antenna branches are switched.

According to the present invention, however, if the accumulated phase error value $Q_{ERR}$ becomes equal to or greater than the predetermined threshold level $Q_{TH}$, temporary switching is made from the antenna branch 1 to the antenna branch 2, and the received signal strength of the antenna branch 2 is measured and the demodulated phase plane of the antenna branch 2 is saved. If the reception status of the antenna branch 2 is good, then antenna branch switching is carried out to start receiving the signal with the proper demodulated phase plane. Therefore, even when switching is made from the antenna branch 1 to the antenna branch 2 immediately after the reception time $T_4$, as shown in FIG. 8 at (H), it is highly possible that the good reception will be kept before and after the antenna branches are switched, as shown in FIG. 8 at (I).

Figure 9:
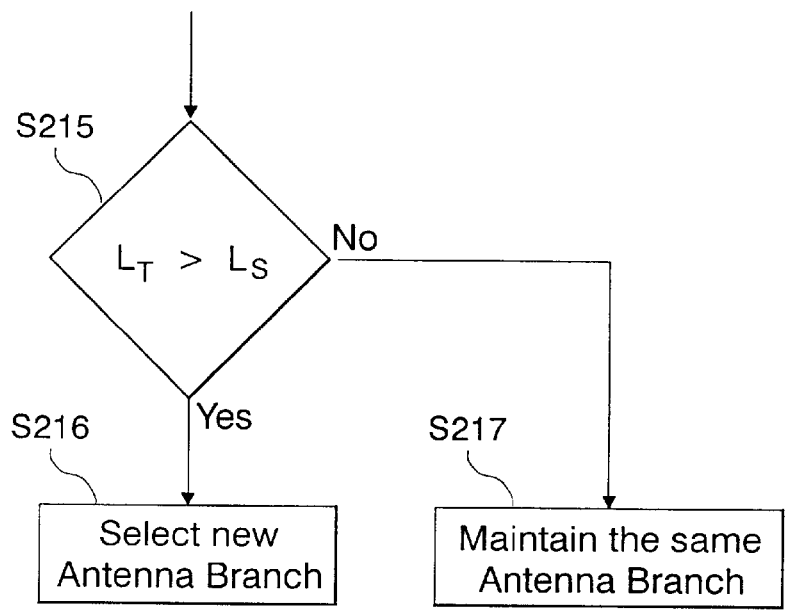
FIG. 9 is a flowchart of a first example of step S215 shown in FIGS. 2 and 6 which is executed to decide whether antenna branches are to be switched or not.

FIG. 9 shows a first example of step S215 shown in FIGS. 2 and 6 which is executed to decide whether antenna branches are to be switched or not. As shown in FIG. 9, if the temporary received signal strength indicator $L_T$ stored in the memory 111 is greater than the normal received signal strength indicator $L_S$ stored in the memory 110 (YES in step S215), then the antenna branch for starting to receive a next reception slot is switched to a new antenna branch in step S216. If the temporary received signal strength indicator $L_T$ is smaller than the normal received signal strength indicator $L_S$ (NO in step S215), then the antenna branch for starting to receive a next reception slot is set to an old antenna branch in step S217.

Figure 10:
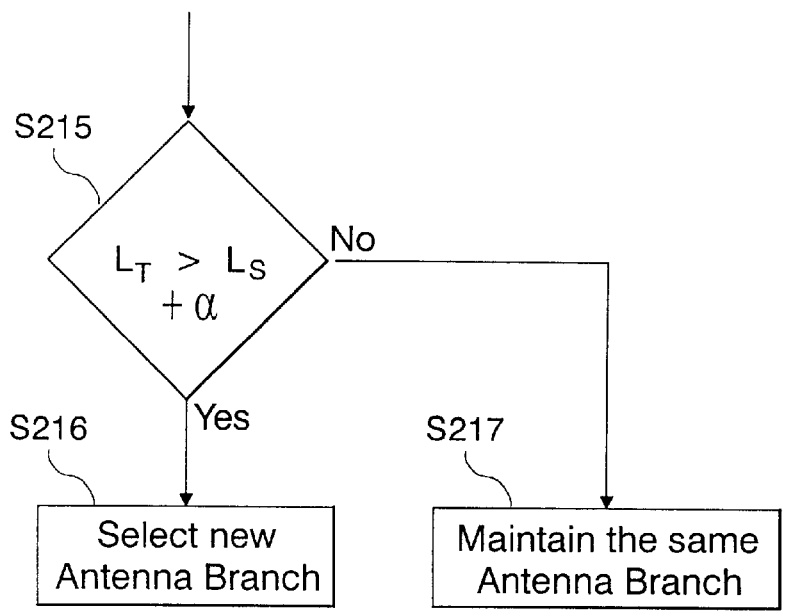
FIG. 10 is a flowchart of a second example of step S215 shown in FIGS. 2 and 6 which is executed to decide whether antenna branches are to be switched or not.

FIG. 10 shows a second example of step S215 shown in FIGS. 2 and 6 which is executed to decide whether antenna branches are to be switched or not. As shown in FIG. 10, if the temporary received signal strength indicator $L_T$ stored in the memory 111 is greater than the sum of the normal received signal strength indicator $L_S$ stored in the memory 110 and a predetermined value a (YES in step S215), then the antenna branch for starting to receive a next reception slot is switched to a new antenna branch in step S216. If the temporary received signal strength indicator $L_T$ is smaller than the sum of the normal received signal strength indicator $L_S$ and the predetermined value α (NO in step S215), then the antenna branch for starting to receive a next reception slot is set to an old antenna branch in step S217.

Figure 11:
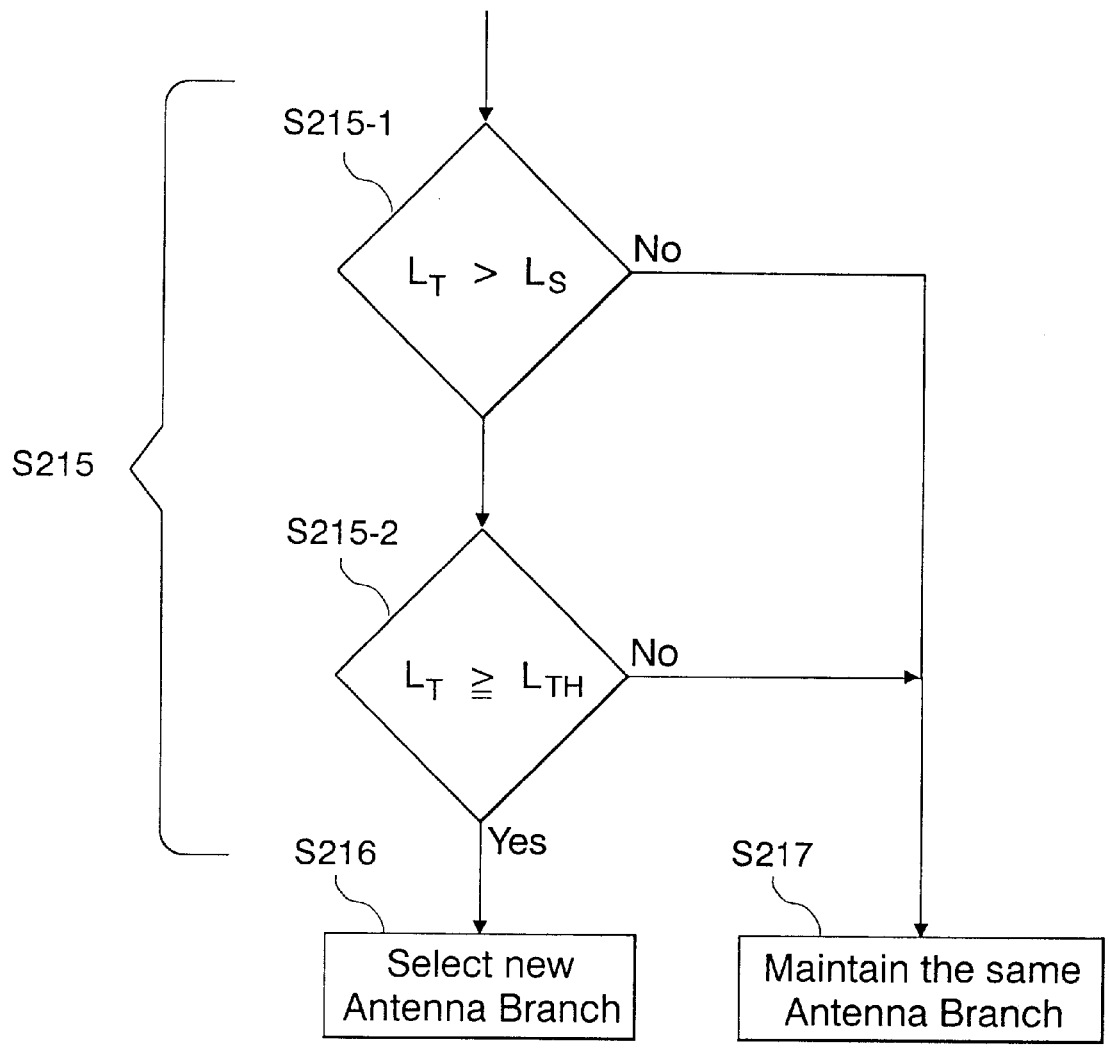
FIG. 11 is a flowchart of a third example of step S215 shown in FIGS. 2 and 6 which is executed to decide whether antenna branches are to be switched or not.

FIG. 11 shows a third example of step S215 shown in FIGS. 2 and 6 which is executed to decide whether antenna branches are to be switched or not. As shown in FIG. 11, if the temporary received signal strength indicator $L_T$ stored in the memory 111 is greater than the normal received signal strength indicator $L_S$ stored in the memory 110 (YES in step S215-1) and if the temporary received signal strength indicator $L_T$ is equal to or greater than the threshold value $L_{TH}$ (YES in step S215-2), then the antenna branch for starting to receive a next reception slot is switched to a new antenna branch in step S216. If the temporary received signal strength indicator $L_T$ is smaller than the normal received signal strength indicator $L_S$ (NO in step S215-1) and if the temporary received signal strength indicator $L_T$ is smaller than the threshold value $L_{TH}$ (NO in step S215-2), then the antenna branch for starting to receive a next reception slot is set to an old antenna branch in step S217. Thus, the success of signal reception is increased since the antenna branches are switched if the temporary received signal strength indicator $L_T$ is equal to or greater than the threshold value $L_{TH}$.

In the second embodiment shown in FIGS. 6 and 7, if the temporary received signal strength indicator $L_T$ is smaller than the threshold value $L_{TH}$, then no antenna branch switching is carried out, but the old branch is selected, and the demodulated phase plane in the preceding reception slot is employed. Therefore, inasmuch as the demodulated phase plane in the poor reception state is not employed, the success of signal reception is further improved.

While preferred embodiments of the present invention have been described using specific terms, such description is for illustrative purposes only, and it is to be understood that changes and variations may be made without departing from the spirit or scope of the following claims.

What is claimed is:

1. An apparatus for antenna-switched diversity reception, comprising:

demodulating means for demodulating data from a phase-modulated signal received by a selected one of antennas;

phase error detecting means for detecting a phase error of each symbol of the received signal as a deviation from an ideal phase;

accumulating means for accumulating phase error; and control means for controlling switching between the antennas if an accumulated value of the phase errors is greater than a predetermined value, wherein said control means comprises means for;

switching a first antenna temporarily to a second antenna, holding the phase of demodulated clock signal of said second antenna in said demodulating means, selecting either one of the antennas based on a reception status of said first antenna and a reception status of said second antenna, selecting one of the phases of the demodulated clock signals held by said demodulating means, and providing the selected one of the phases to said demodulating means.

2. An apparatus for antenna-switched diversity reception of a phase-modulated signal composed of frames, comprising:

demodulating means for demodulating data from each of the frames of the phase-modulated signal received by a selected first one of antennas;

phase error detecting means for detecting a phase error of each symbol of the received signal as a deviation from an ideal phase;

accumulating means for accumulating phase errors of the respective frames; and control means for controlling switching between the antennas in a next frame if an accumulated value of the phase errors is greater than a predetermined value at a predetermined slot of predetermined frame, wherein said control means comprises means for, if the accumulated value of the phase errors in a past frame is smaller than said predetermined value at the predetermined slot position in the frame, holding the phase of demodulated clock signal in the frame in said demodulating means, holding the phase of the demodulated clock signal of a first antenna selected in a present frame in said demodulating means, and when the accumulated value of the phase errors is greater than said predetermined value, switching the first antenna temporarily to a second antenna, holding the phase of demodulated clock signal of said second antenna in said demodulating means, selecting either one of the antennas based on a reception status of said first antenna and a reception status of said second antenna, selecting one of the phases of the demodulated clock signals held by said demodulating means, and providing the selected one of the phases to said demodulating means.

3. An apparatus according to claim 2, wherein said control means comprises means for switching said selected first one of the antennas temporarily to another one of the antennas if the accumulated value of the phase errors is greater than said predetermined value, and determining a next antenna to be selected for the next frame by comparing a reception status of said selected first one of the antennas with a reception status of said other one of the antennas.

4. An apparatus according to claim 2, wherein said demodulating means comprises:

phase holding means for holding phases of a plurality of demodulated clock signals;

selecting means for selecting the phase of a desired one of the demodulated clock signals; and a demodulator for demodulating the data according to the selected phase of the demodulated clock signal.

5. An apparatus according to claim 4, wherein said control means comprises means for selecting the phase of the demodulated clock signal which corresponds to said one of the antennas which is selected based on the reception status of said first antenna and the reception status of said second antenna, and providing the selected phase to said demodulator.

6. An apparatus according to claim 4, wherein said control means comprises means to, if both the reception status of said first antenna and the reception status of said second antenna have not reached a predetermined reference, selecting the first antenna and providing the phase of the demodulated clock signal in said past frame to said demodulator.

7. An apparatus according to claim 4, wherein said control means comprises means for providing the phase of the demodulated clock signal of said first antenna, which is held by said phase holding means, to said demodulator when said first antenna is temporarily switched to second antenna.

8. An apparatus for antenna-switched diversity reception of a phase-modulated signal composed of frames, comprising:

demodulating means for demodulating data from each of the frames of the phase-modulated signal received by a selected first one of antennas;

wherein said demodulating means comprises:
    phase holding means for holding phases of a plurality of demodulated clock signals;
    selecting means for selecting the phase of a desired one of the demodulated clock signals; and
    a demodulator for demodulating the data according to the selected phase of the demodulated clock signal:
  phase error detecting means for detecting a phase error of each symbol of the received signal as a deviation from an ideal phase;
  accumulating means for accumulating phase errors of the respective frames; and
  control means for controlling switching between the antennas in a next frame if an accumulated value of the phase errors is greater than a predetermined value at a predetermined slot of predetermined frame,
  wherein said control means comprises means for, if the accumulated value of the phase errors in a past frame is smaller than said predetermined value at the predetermined slot position in the frame, holding the phase of the demodulated clock signal in the frame in said phase holding means, holding the phase of the demodulated clock signal of a first antenna selected in a present frame in said phase holding means, and when the accumulated value of the phase errors is greater than said predetermined value, switching the first antenna temporarily to a second antenna, holding the phase of the demodulated clock signal of said second antenna in said phase holding means, selecting either one of the antennas based on a reception status of said first antenna and a reception status of said second antenna, selecting one of the phases of the demodulated clock signals held by said phase holding means, and providing the selected one of the phases to said demodulator.

9. A method of antenna-switched diversity reception of a phase-modulated signal composed of frames, comprising the steps of:

detecting a phase error of each symbol of the received signal as a deviation from an ideal phase when demodulating data from each of the frames of the phase modulated signal received by a selected first one of antennas;
  accumulating phase errors of the respective frames; and
  controlling switching between the antennas for a next frame if an accumulated value of the phase errors is greater than a predetermined value at a predetermined slot position in one of the frames,
  wherein said step of controlling switching between the antennas for the next frame comprises the steps:
    if the accumulated value of the phase errors in a past frame is smaller than said predetermined value at the predetermined slot position in the frame, holding the phase of the demodulated clock signal in the frame, holding the phase of the demodulated clock signal of a first antenna selected in a present frame;
    when the accumulated value of the phase errors is greater than said predetermined value, switching the first antenna temporarily to a second antenna;
    holding the phase of the demodulated clock signal of said second antenna;
    selecting either one of the antennas based on a reception status of said first antenna and a reception status of said second antenna; and
    selecting a demodulating phase clock signal from one of the phases of the demodulated clock signals which are held, and demodulating said phase-modulated signal with the selected phase clock signal.

10. A method according to claim 9, wherein said step of controlling switching between the antennas for the next frame comprises the steps of:
  switching said selected one of the antennas temporarily to another one of the antennas if the accumulated value of the phase errors is greater than said predetermined value; and
  determining a next antenna to be selected for the next frame by comparing a reception status of said selected one the antennas with a reception status of said other one of the antennas.

11. A method according to claim 9, wherein said step of controlling switching between the antennas for the next frame comprises the steps of:
  selecting the phase of the demodulated clock phase timing signal which corresponds to said one of the antennas which is selected based on the reception status of said first antenna and the reception status of said second antenna; and
  demodulating said phase-modulated signal with the selected clock phase timing signal.

12. A method according to claim 9, wherein said step of controlling switching between the antennas for the next frame comprises the steps of:
  if both the reception status of said first antenna and the reception status of said second antenna have not reached a predetermined reference, selecting said first antenna;
  selecting the phase of the demodulated clock signal in said past frame; and
  demodulating said phase-modulated signal with the selected phase.

13. A method according to claim 9, wherein said step of controlling switching between the antennas for the next frame comprises the steps of:
  when said first antenna is temporarily switched to said second antenna, selecting the phase signal of the demodulated clock phase timing signal held in said first antenna branch; and
  demodulating said phase-modulated signal with the selected phase signal.

* * * * *